United States Patent [19]

Marzorati et al.

[11] 4,380,326
[45] Apr. 19, 1983

[54] BELT TIGHTENING TOOL

[76] Inventors: Ermanno A. Marzorati, 845 Rim Crest Cir.; Murrel A. Mathis, 849 Rim Crest Cir., both of Westlake Village, Calif. 91361

[21] Appl. No.: 301,937

[22] Filed: Sep. 14, 1981

Related U.S. Application Data

[63] Continuation-in-part of Ser. No. 161,749, Jun. 23, 1980, abandoned.

[51] Int. Cl.³ .............................................. B66F 3/00
[52] U.S. Cl. .................................................. 254/131
[58] Field of Search ................... 254/131, 120, 25, 17, 254/129, 130; 81/3 R, 90 B; 29/267, 219, 220

[56] References Cited

U.S. PATENT DOCUMENTS

| | | | |
|---|---|---|---|
| 2,087,148 | 7/1937 | Hempy | 254/25 |
| 2,629,584 | 2/1953 | Cannon | 254/120 |
| 2,681,791 | 6/1954 | Hahn | 254/131 |
| 2,718,374 | 9/1955 | Kellenbayer | 254/131 |
| 2,896,910 | 7/1959 | Cooper et al. | 254/25 X |
| 3,011,249 | 12/1961 | Apple et al. | 29/267 X |
| 3,680,834 | 8/1972 | Holloway | 254/25 |
| 4,183,503 | 1/1980 | Ward | 254/131 |
| 4,211,446 | 7/1980 | Shultz | 254/131 |
| 4,244,559 | 1/1981 | Mote | 254/131 X |

*Primary Examiner*—Robert C. Watson
*Attorney, Agent, or Firm*—Jack C. Munro

[57] ABSTRACT

A tool to facilitate the tightening of a belt which operates between a power output shaft of an engine and a power generating device, such as a generator or alternator, which is mounted spaced from the engine. The power generating device is to be pivotally mounted with respect to the engine block. Each end of the tool of the first embodiment is specially configured into an L-shaped section. The long leg of the L-shaped section terminates in a hook with there being an elongated cut-out section adjacent the hook. The hook is to be inserted within a ventilating opening assembly provided within the power generating device and the tool then positioned so that torque can be applied to the power generating device tending to pivot such about its mounting bracket until the belt assumes a sufficiently taut configuration. The mounting bracket assembly is then fixed by appropriate fastening means to prevent pivotal movement of the power generating device with respect to the engine. In the second embodiment, only one end is operative. This operative end includes a planar cross plate mounted in an inclined manner relative to the longitudinal center axes of the tool. Either outer free end of the inclined plate is capable of functioning as a fulcrum point against the housing of the power generating apparatus. One fulcrum point is used for one type of generating apparatus installation, with the other fulcrum point to be used for another type of installation. Each fulcrum point works in conjunction with a hook formed at the outer end of the operative end.

4 Claims, 6 Drawing Figures

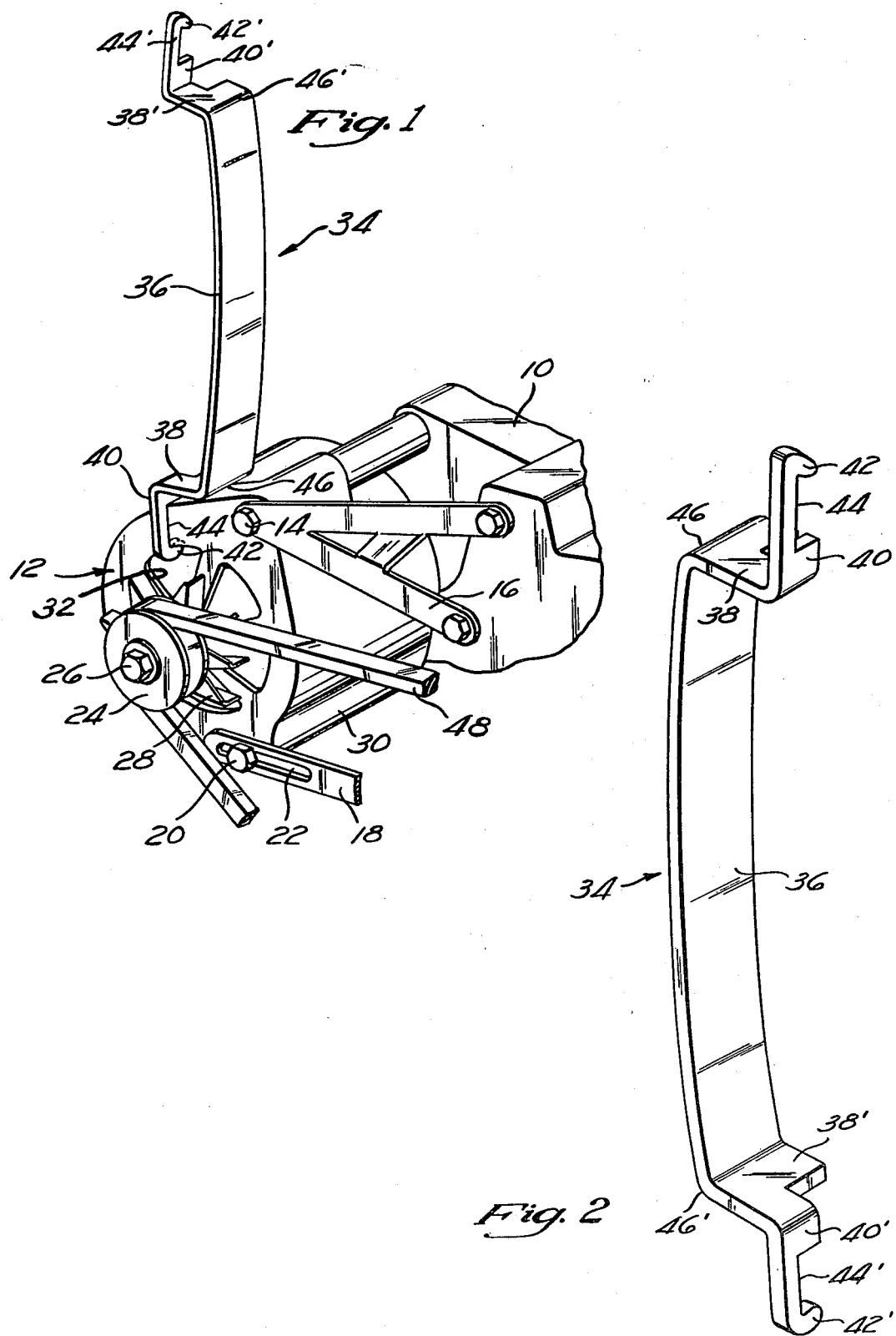

BELT TIGHTENING TOOL

REFERENCE TO PRIOR APPLICATION

This application is a Continuation-In-Part of patent application Ser. No. 161,749, filed June 23, 1980, now abandoned, by the same inventors.

BACKGROUND OF THE INVENTION

The use of belts for transmission of mechanical power has long been known. The belt can be constructed of various materials of construction, but normally a common material of construction would be a fabric and/or rubber composition. Such belts are to be connected to a power output shaft of an engine, such as a crank shaft. The belt will be connected directly to a pulley which is fixedly secured to the crank shaft. A power generating device is located separate from the engine and is to be rotatably driven by the belt. This belt is connected to a separate pulley which is mounted in conjunction with the power generating device. Conventional types of power generating devices are generators or alternators. A normal use for such a belt would be in conjunction with an internal combustion engine of a vehicle wherein the belt is employed to operate the electrical generator or alternator of the vehicle.

Current automobile engine compartments are quite crowded due to the including within the engine of smog control equipment and air conditioners. The belt extending from the engine to the alternator or generator must be routinely tightened to make sure that the belt is operating at the desired degree of tautness so that there is no slippage and the alternator or generator is operating at maximum efficiency. Also, the belt needs to be tightened if the belt is broken and has been replaced, or if the generator or alternator has been repaired and is being reinstalled.

At the present time, the typical manner in which the generator or alternator belt is tightened is through the use of a tool, such as an elongated pipe or rod. This pipe or rod is to be inserted somewhere between the generator or alternator and somehow torque applied to cause the generator or alternator to pivot about its pivot bracket assembly, thereby causing the belt to be tightened to the desired degree of tautness. However, because of the extensive amount of paraphernalia within the engine compartment, the locating of the pipe or rod in order to achieve this end result is extremely difficult. Also, because of the normal constructional arrangement between the generator or alternator and the engine block, it is difficult to locate the pipe or rod in order to apply the torque in the right direction in order to achieve the tightening of the belt. Further, the generator or alternator is connected to a fan blade assembly for cooling which makes it difficult to tighten the belt.

There is a definite need for a tool which will quickly and easily tighten the belt of a generator or alternator within an automobile engine compartment.

SUMMARY OF THE INVENTION

The first embodiment of the structure of this invention relates to an elongated member which is to be constructed of spring steel so as to have a certain amount of give, or resiliency. The elongated member has a fore end and an aft end which are mirror images of each other. The fore end is to be employed with a generator or alternator within a vehicle engine compartment which is mounted on one side of the engine and the other end of the tool is to be used with a generator or alternator which is mounted on the opposite side of the engine. Each end is constructed in a L-shaped manner with there being a fulcrum point created in the integral connection between the main body section of the elongated member and the short leg of the el. The long leg of the el includes an elongated cut-out section. The long leg of the el terminates in a hook, with the plane of the hook being located substantially parallel to the plane of the main body section. The hook is to be placed adjacent the frontal surface of the power generating device and then turned ninety degrees so that the hook will engage within an air cooling opening, which is always formed within the frontal surface of such a power generating device. The operator then applies a pushing force against the main body section of the tool, which causes the tool to exert a torque about the fulcrum point which is resting against the exterior housing of the power generating device directly adjacent the pivot axis with respect to the engine. After the power generating device is pivoted a sufficient amount so as to cause the belt to assume the desired taut position, the pivot bracket assembly mounting the power generating device with respect to the engine is tightened to fix the position of the power generating device with respect to the engine.

The second embodiment of this invention relates to the use of a single operative end as opposed to dual opperative ends. However, the single operative end is to be utilized with the power generating apparatus which is mounted on either the right or the left side of the engine.

The second embodiment comprises an elongated member which terminates in a hook. The interior portion of the hook is smoothly contoured into an inclined bevel to facilitate insertion for one particular type of power generating apparatus. A cut-out section extends from the hook to a cross plate which has been attached to the body portion of the tool.

Either end of the cross plate is to function as a fulcrum point in contact with the exterior housing of the power generating apparatus. Because of the inclination of the cross plate, there is a shorter distance between the hook and one end of the cross plate than the distance from the hook and the other end of the cross plate. One end of the cross plate is to be utilized for power generating apparatuses which is mounted on the right side of the engine with the other end of the cross plate being utilized for power generating apparatuses located to the left side of the engine.

The reason for the beveling of the hook, as well as the inclination of the cross plate, is due to the locating of a fan blade assembly across the front surface of the power generating apparatus. Because of the construction of the fan blade assembly, as well as the construction of the housing for the power generating apparatus, different distances between the hook and the ends of the cross plate are necessary in order to achieve the desired tightening of the belt.

The primary objective of this invention is to construct a tool which can be quickly and easily employed to tighten the belt which transmits rotational power between an engine and a power generating device spaced from the engine.

BRIEF DESCRIPTION OF THE DRAWINGS

FIG. 1 is an overall, perspective view of a power generating device shown mounted by a pivot bracket assembly in conjunction with an engine block and the first embodiment of the tool of this invention which is being employed to facilitate tightening of the power transmitting belt connected to the power generating device;

FIG. 2 is an overall perspective view of the first embodiment of the belt tightening tool of this invention;

DETAILED DESCRIPTION OF THE SHOWN EMBODIMENTS

Figure 3:
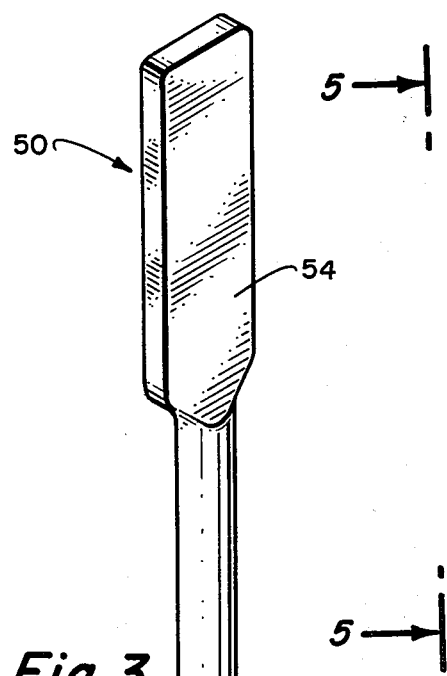
FIG. 3 is a perspective view of a second embodiment of the belt tightening tool of this invention.

Referring particularly to the drawings, there is shown a conventional engine block 10 which has a power output shaft, (not shown). A power generating device 12, in the form of a generator or alternator, is pivotally mounted by means of an elongated bolt 14 on the engine block 10. A support bracket 16 also connects between the bolt 14 and the engine block 10 to further support the power generating device 12. A lower bracket arm 18 is also connected to the power generating device 12 by means of a bolt 20. The not-shown end of the arm 18 is to be attached to the engine block 10. The bolt 20 rides within an elongated slot 22 formed within the arm 18.

The power generating device 12 includes a drive shaft (not shown) upon which pulley 24 is fixedly secured. A bolt 26 is fixedly secured through the pulley 24 to the drive shaft. A fan blade assembly 28, for cooling purposes, is fixedly mounted on the shaft between the pulley 24 and the housing 30 of the power assisting device 12. Formed within the housing 20 directly adjacent the fan blade assembly 28 are a plurality of openings 32. The air driven from the blade assembly 28 is to be moved through the openings 32 of the power generating device 12.

It is to be noted that the fan blade assembly 28 comprises a plurality of separate fan blades which are connected together through a hub (not shown). Also, the blades of the fan blade assembly 28 are basically right-angled shaped when observed from the front of the power generating device 12. It is the construction of the fan blade assembly 28 which makes it difficult to insert the tool 34 of this invention in its operative position.

The first embodiment of tool 34 of this invention is constructed of an elongated main body section 36. The main body section 36 is thin and substantially planar and is slightly arcuate, though it is not necessary for the main body section 36 to be arcuate.

The fore end of the main body section 36 has attached thereto an L-shaped section which takes the form of a short leg 38 and a long leg 40. Leg 40 is perpendicular to the short leg 38, with the short leg 38 being substantially perpendicular to the elongated main section 36. The long leg 40 terminates in a hook 42. Formed within the elongated leg 40 directly adjacent the hook 42 is an elongated cut-out section 44.

Normally, in most installations, there is a narrow gap located between the fan blade assembly 28 and the openings 32. For purposes of illustration, this is not so depicted in the drawing. In actual practice, the hook section 42 will be slipped between the fan blade assembly 28 and the openings 32 until the hook 42 connects with an opening 32. The operator will then turn the tool 34 ninety degrees until the hook 42 extends within the particular opening 32, as is shown within FIG. 1 of the drawing. The portion of the housing 30, between the opening 32 and the outside wall of the housing 30, is located within the cut-out section 44. The operator then exerts a pushing force adjacent the elongated member 36 which causes the elongated section 36 to tend to exert a moment about the fulcrum point 46. This fulcrum point 46 acts against the exterior wall of the housing 30 and will be positioned very near the pivot axis established by the bolt 14. There will be more than sufficient torque supplied to the power generating device 12 tending to pivot such about the bolt 14 which causes the bolt 20 to slide toward the outer end of the elongated slot 22. The belt 48 is mounted around the pulley 24 and is also mounted about a pulley (not shown) which is attached to the power output shaft (not shown) extending from the engine block 10. Once the belt 48 is sufficiently taut, the operator is to then use a conventional tool, such as a wrench, to tighten the bolt 20 to fixedly position the power generating device 12 in this established position.

The fore end of the tool 34, which has been previously described, is designed to work for a power generating device 12 which is mounted on one side (actually, the right side) of the engine block 10. In some vehicle installations, the power generating device 12 will be mounted on the opposite side, (left side) of the engine block 10. In such an instance, the aft end of the tool 34 would be used, rather than the fore end. The aft end is a mirror image of the fore end, with like numerals being employed to refer to like parts. The aft end would be used in precisely the same manner. If the aft end was not made available, in such an installation of the power generating device 12, it would not be possible to locate the fulcrum point 46 very near the pivot axis created by the bolt 14. Actually, it would locate it outwardly from the hook 42 rather than in between the hook 42 and the fastener 14.

Figure 4:
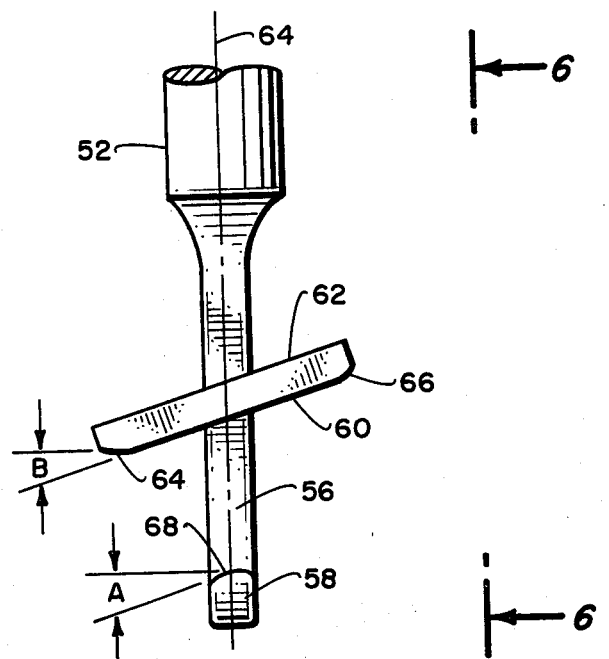
FIG. 4 is a front, elevational view of the operative end of the second embodiment of the belt tightening tool of this invention.
Figure 5:
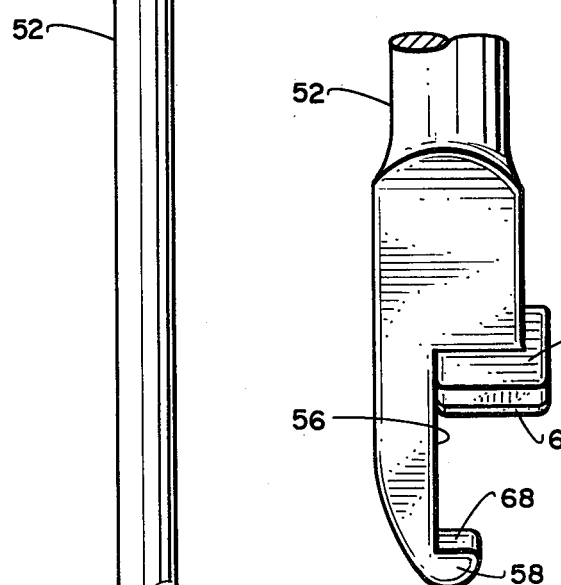
FIG. 5 is a left side view of the operative end of the belt tightening tool of this invention taken along line 5—5 of FIG. 4.
Figure 6:
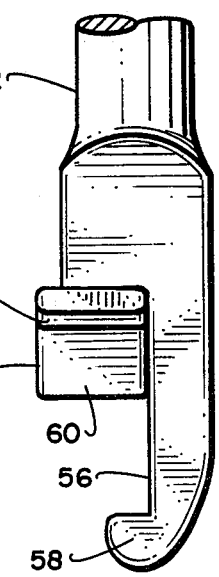
FIG. 6 is a right side view of the operative end of the belt tightening tool of this invention taken along line 6—6 of FIG. 4.

In referring particularly to FIGS. 3-6 of the drawings, there is shown the second embodiment of tool 50 of this invention. The tool 50 comprises an elongated body section 52 which is formed into a manually graspable section 54 at the inner end thereof. The outer end and operative end includes a cut-out section 56. The outer end of the cut-out section 56 terminates in a hook 58. The inner end of the cut-out section 56 is terminated by a planar inside surface of a cross plate 62.

The planar inside surface 60 is inclined at angle B relative to the longitudinal center axis 64 of the elongated member 52. A preferable angle B is approximately 18°. The cross plate 62 forms a first fulcrum point 66 at one end of the plate 62, with a second fulcrum point 66 being formed at the opposite end of the plate 62. Because of the inclining of the cross plate 62, the spacing from the first fulcrum point 64 to the inside surface of the hook 58 is substantially less than the spacing from the second fulcrum point 66 to the inside surface of the hook 58.

The inside surface 68 is also beveled at an angle shown to be angle A. Although the surface 58 is smoothly contoured, the general configuration of the bevel represented by angle A is substantially equal to angle B. The reason for this is as follows: For a power generating device 30, that is mounted on the right side of the engine, it is required to use the first fulcrum point 64. The hook 58 is inserted between the fan blade assembly 28 so that the hook 58 will connect with an opening 32. The operator then rotates the elongated member 90 degrees to have the hook 58 extend within the opening 32. Because of the small amount of spacing (which is necessary to apply the desired degree of torque) between the first fulcrum point 64 and the inside surface 68 of the hook 58, the inside surface 68 will actually ride against the radial outermost wall of the opening 32 within which hook 58 is being inserted. In order to facilitate a sliding movement of the hook 58 across this wall, the inside surface 68 is beveled to approximately angle A.

Once the tool 52 is installed for the power generating apparatus 30 that is mounted on the right side of an engine, there is very little "play" between the tool 52 and the power generating apparatus 30. The operator then applies the desired torque in the desired direction in order to tighten the belt 48.

The portion of the tool located between the second fulcrum point 66 and the inner surface 68 of the hook 58 is to be utilized when the power generating apparatus 30 is mounted on the left side of the engine. The tool 50 is installed in position in conjunction with a ventilating opening 32 in essentially the same manner as previously described. However, for this particular type of installation, there will be a greater amount of "play" between the tool 50 and the power generating apparatus 30. In this particular type of usage, and because of the way that the exterior housing of the power generating apparatus 30 is constructed, it is readily able to apply the desired amount of torque in order to tighten the belt 48.

Also, because of the triangularly shaped configuration of each of the fan blades of the fan blade assembly 28, it has been found to be desirable to specifically configure the foregoing described arrangement between the hook 58 and the cross plate 62 relating to the spacing between the fulcrum points 64 and 66 and also the beveling of the interior surface of the hook 58. In other words, the fan blades of the fan blade assembly 28 interfere with the inserting of the hook 58 in location within a ventilating opening 32.

What is claimed is:

1. In combination with an engine, a power generating apparatus mounted on said engine by a pivot bracket assembly, said power generating apparatus being spaced from said engine and being pivotable in respect thereto, a belt connecting said engine and said power generating apparatus, a tool to facilitate tightening of said belt, said tool comprising:

an elongated member terminating in a fore end and an aft end, said elongated member having a main body section located substantially in a first plane, a cross plate forming a second plane, said cross plate being secured to said elongated member, said fore end terminating in a hook, said hook being located within said first plane, a cut-out section formed within said said fore end adjacent said hook, said cut-out section terminating in an inner edge and an outer edge, said cross plate forming said inner edge of said cut-out section with said hook forming said outer edge, the ends of said cross plate forming first and second fulcrum points, whereby said hook is to engage with said power generating apparatus and one of said fulcrum points is to be placed against the exterior of said power generating apparatus and by exerting force against said main body section the said power generating apparatus is caused to pivot about said pivot bracket assembly thereby tightening said belt; and said second plane being inclined in respect to said first plane so that the spacing between said first fulcrum point and said hook being less than the spacing between said second fulcrum point and said hook.

2. The combination as defined in claim 1 wherein:
the angle of inclination of said second plane relative to said first plane being approximately eighteen degrees.

3. The combination as defined in claim 1 wherein:
said hook including a smoothly contoured beveled surface, said beveled surface assuming a general inclination substantially parallel to said second plane.

4. The combination as defined in claim 2 wherein:
said hook including a smoothly contoured beveled surface, said beveled surface assuming a general inclination substantially parallel to said second plane.

* * * * *